United States Patent [19]

Slicker

[11] Patent Number: 5,403,249
[45] Date of Patent: Apr. 4, 1995

[54] METHOD AND APPARATUS FOR ROBUST AUTOMATIC CLUTCH CONTROL

[75] Inventor: James M. Slicker, Union Lake, Mich.

[73] Assignee: Eaton Corporation, Cleveland, Ohio

[21] Appl. No.: 165,957

[22] Filed: Dec. 14, 1993

Related U.S. Application Data

[63] Continuation-in-part of Ser. No. 772,778, Oct. 7, 1991, Pat. No. 5,275,267.

[51] Int. Cl.$^6$ ............... B60K 41/28; F16D 43/00
[52] U.S. Cl. ................... 477/176; 192/103 R
[58] Field of Search ............. 477/175, 176, 180; 192/103 R

[56] References Cited

U.S. PATENT DOCUMENTS

| | | |
|---|---|---|
| 3,297,926 | 1/1967 | Campbell et al. |
| 4,081,065 | 3/1978 | Smyth et al. |
| 4,457,411 | 7/1984 | Hiramatsu |
| 4,674,609 | 6/1987 | Sturges et al. |
| 4,724,939 | 2/1988 | Lockhart et al. |
| 4,768,635 | 9/1988 | Sakurai et al. |
| 4,792,902 | 12/1988 | Hrovat et al. |
| 4,823,925 | 4/1989 | Ohkumo et al. |
| 5,293,316 | 3/1994 | Slicker ............... 477/86 X |

FOREIGN PATENT DOCUMENTS

| | | |
|---|---|---|
| 2153954 | 8/1985 | United Kingdom |
| 2231116 | 7/1990 | United Kingdom |

Primary Examiner—Rodney H. Bonck
Attorney, Agent, or Firm—Young, MacFarlane & Wood

[57] ABSTRACT

An automatic clutch controller for a vehicle that reduces the oscillatory response to clutch engagement. The automatic clutch controller receives inputs from an engine speed sensor and a transmission input speed sensor and develops a clutch actuation signal controlling a clutch actuator from disengaged to fully engaged. The clutch engagement signal at least partially engages the friction clutch in a manner to cause the measured transmission input speed to asymptotically approach engine speed employing an approximate inverse model of this oscillatory response. The automatic clutch controller preferably includes a slip integral function and a differential engine speed function, which together adaptively adjust clutch engagement corresponding to vehicle loading. The automatic clutch controller includes a prefilter and a compensator constructed to reduce the need for detailed particularization for individual vehicles or vehicle models.

A lag compensation function in the compensator adds robustness to the system by increasing low frequency gain. A freeze function suspends operation of the slip integral, the prefilter and the compensator during engine deceleration or when throttle position is high and engine speed is low, to moderate or stop clutch advance to prevent engine overloading.

13 Claims, 4 Drawing Sheets

METHOD AND APPARATUS FOR ROBUST AUTOMATIC CLUTCH CONTROL

RELATED APPLICATION

This is a continuation-in-part application of U.S. Ser. No. 07/772,778, filed Oct. 7, 1991, now U.S. Pat. No. 5,275,267.

TECHNICAL FIELD OF THE INVENTION

The technical field of this invention is that of automatic clutch controls, and more particularly closed loop automatic clutch control and method for reducing oscillatory response to launch of a motor vehicle.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not exhibited in the use of the hydraulic torque converters. The mechanical drive train of a motor vehicle typically exhibits considerable torsional compliance in the driveline between the transmission and the traction wheels of the vehicle. This torsional compliance may be found in the drive shaft between the transmission and the differential or the axle shaft between the differential and the driven wheels. It is often the case that independent design criteria encourages or requires this driveline to exhibit considerable torsional compliance. The existence of substantial torsional compliance in the driveline of the motor vehicle causes oscillatory response to clutch engagement. These oscillatory responses can cause considerable additional wear to the drive train components and other parts of the vehicle. In addition, these oscillatory responses can cause objectionable passenger compartment vibrations.

The oscillatory response of the driveline to clutch engagement is dependent in large degree on the manner in which the input speed of the transmission, i.e. the speed of the clutch, approaches the engine speed. A smooth approach of these speeds, such as via a decaying exponential function, imparts no torque transients on clutch lockup. If these speeds approach abruptly, then a torque transient is transmitted to the driveline resulting in an oscillatory response in the vehicle driveline. My previous patent application U.S. Ser. No. 07/772,778 entitled CLOSED LOOP LAUNCH AND CREEP CONTROL FOR AUTOMATIC CLUTCH WITH ROBUST ALGORITHM, now U.S. Pat. No. 5,275,267, addressed solutions to the oscillatory response of the driveline. This invention is based in part on that previous work and adds additional robustness.

Still another potential problem encountered in automatic clutch control is the possibility of engine overload imposed by aggressive clutch engagement under certain conditions which leads to engine speed droop and even clutch dumping to avoid stalling the engine.

Thus it would be an advantage to provide automatic clutch actuation of a friction clutch that reduces the oscillatory response to clutch engagement and at the same time avoids engine overload. The problem of providing such automatic clutch actuation is considerably increased in large trucks. In particular, large trucks exhibit a wide range of variability in response between trucks and within the same truck. The total weight of a particular large truck may vary over an 8 to 1 range from unloaded to fully loaded. The driveline compliance may vary over a range of about 2 to 1 among different trucks. Further, the clutch friction characteristic may vary within a single clutch as a function of degree of clutch engagement and between clutches. It would be particularly advantageous to provide such an automatic clutch actuation system that does not require extensive adjustment to a particular motor vehicle or the operating condition of the motor vehicle.

SUMMARY OF THE INVENTION

This invention is an automatic clutch controller used in a combination including a source of motive power, a friction clutch, and at least one inertially-loaded traction wheel connected to the friction clutch that has a torsional compliance exhibiting an oscillatory response to torque inputs. The automatic clutch controller is preferably used with a transmission shift controller. This automatic clutch controller provides smooth clutch engagement during vehicle launch and following transmission shifts to minimize the oscillatory response to clutch engagement. This automatic clutch controller is useful in large trucks.

The automatic clutch controller receives inputs from an engine speed sensor and a transmission input speed sensor. The transmission input speed sensor senses the rotational speed at the input to the transmission, which is the output of the friction clutch. The automatic clutch controller develops a clutch engagement signal controlling a clutch actuator between fully disengaged and fully engaged positions. The clutch engagement signal engages the friction clutch in a manner causing asymptotic approach of the transmission input speed to a reference speed. This minimizes the oscillatory response to torque inputs of the inertially-loaded traction wheel.

In a launch mode, corresponding to normal start of the vehicle, or after transmission shifts, the clutch engagement signal causes the transmission input speed to asymptotically approach the engine speed.

The automatic clutch controller includes construction to reduce the need for detailed particularization for individual vehicles or vehicle models. Engine speed is supplied to a prefilter. The prefilter serves to shape the system transient response. An algebraic summer forms the controlled error by subtracting the transmission input speed signal from the prefiltered transmission input speed reference signal. This error signal is supplied to a lag compensator having sufficient gain as a function of frequency to reduce the system closed loop sensitivity to vehicle parameter variations and which adds robustness to the control by increasing gain at low frequencies. The compensator produces a clutch engagement signal for controlling clutch engagement in a manner to minimize the oscillatory response to clutch engagement.

The automatic clutch controller is preferably implemented in discrete difference equations executed by a digital microcontroller. The microcontroller implements a lag compensator and a main compensator. The lag compensator reduces system error by increasing gain at low frequencies. The main compensator has a transfer function approximately the inverse of the transfer function of the inertially-loaded traction wheel. This compensator transfer function includes a notch filter covering the region of expected oscillatory response of the driveline. The frequency band of this notch filter must be sufficiently broad to cover a range of frequencies because the oscillatory response frequency may change with changes in vehicle loading and driveline characteristics. The compensator also preferably provides an elevated response in range of frequencies where the driveline response is a minimum to increase the loop gain and reduce sensitivity to variations in vehicle characteristics.

The clutch actuation controller preferably stores sets of coefficients for the discrete difference equations corresponding to each gear ratio of the transmission. The clutch actuation controller recalls the set of coefficients corresponding to the selected gear ratio. These recalled set of coefficients are employed in otherwise identical discrete difference equations for clutch control.

The controller preferably includes an integral error function for insuring full clutch engagement within a predetermined interval of time after initial partial engagement. Any long term difference between the transmission input speed reference signal and the transmission input speed eventually drives the clutch to full engagement.

The integral function, the prefilter function and the compensator function are frozen or suspended under conditions indicative of engine overload in order to avoid a clutch engagement rate which would pull down engine speed. A freeze logic module identifies two such overload conditions: 1) engine deceleration, and 2) engine speed less than a predetermined speed threshold and throttle position above a throttle threshold. While either of these conditions exist, the integrator, the prefilter and the compensator are frozen so that their outputs do not change until the overload condition is removed; then the functions are enabled and the clutch advance resumes.

The automatic clutch controller further includes a differentiator compensator connected to the engine speed sensor. The engine speed differential signal responding to the rate of change of the engine speed signal is added to the signal supplied to the clutch actuator. This differential signal causes rapid advance of clutch actuation when the engine speed is accelerating. Rapid advance of the clutch in this case prevents the engine speed from running away. Filtering prevents a rapid decrease of the differential signal upon engine deceleration. An integrator connected to the differentiator compensator saves the clutch actuation level needed to restrain the engine speed once the engine speed is no longer accelerating.

BRIEF DESCRIPTION OF THE DRAWINGS

These and other objects and aspects of the present invention will be described below in conjunction with the drawings in which.

DETAILED DESCRIPTION OF THE PREFERRED EMBODIMENTS

Figure 1:
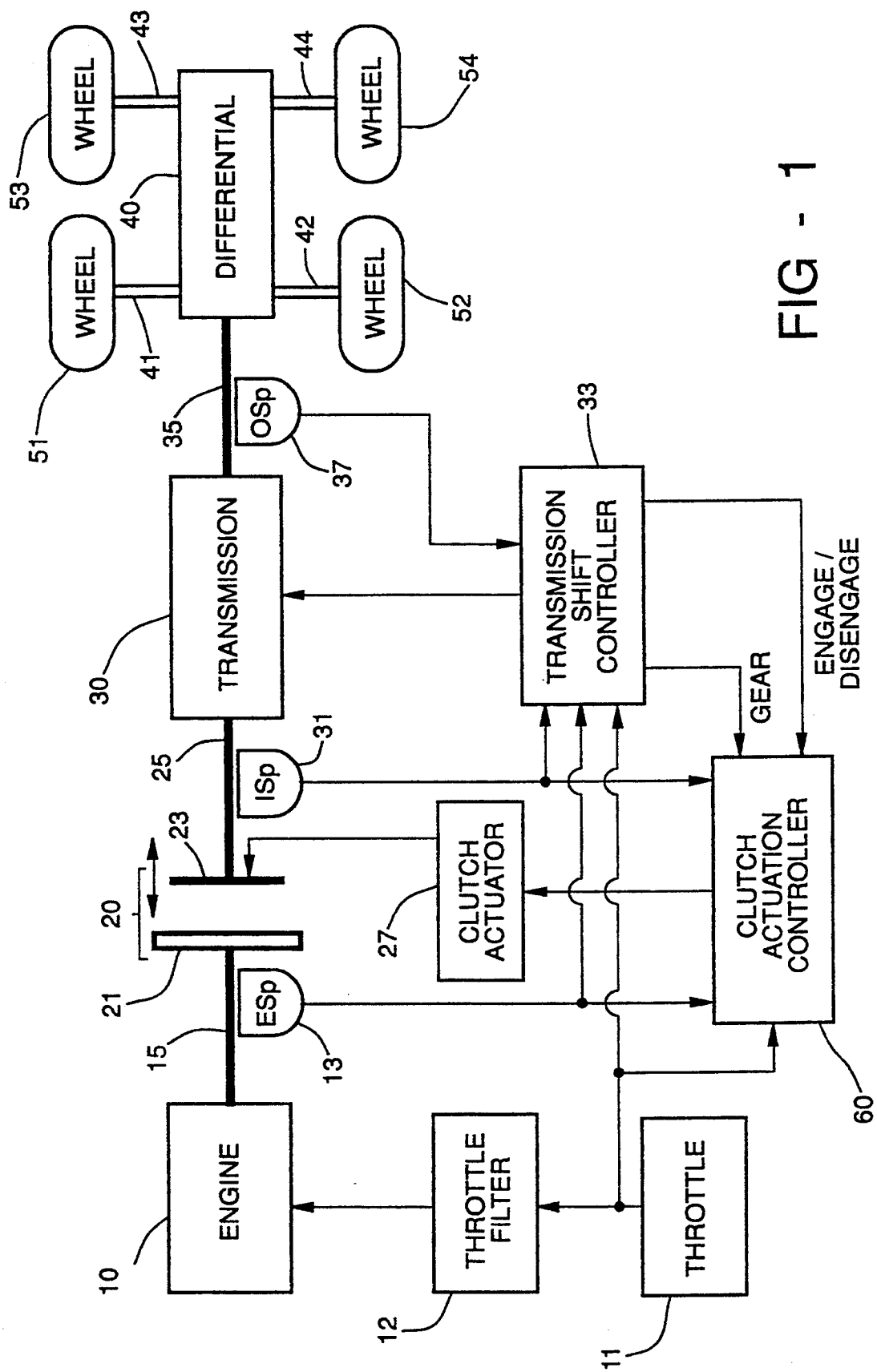
FIG. 1 illustrates a schematic view of the vehicle drive train including the clutch actuation controller of the present invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. Throttle 11, which is typically a foot operated pedal, controls operation of engine 10 via throttle filter 12. Throttle filter 12 filters the throttle signal supplied to engine 10 by supplying a ramped throttle signal upon receipt of a step throttle increase via throttle 11. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
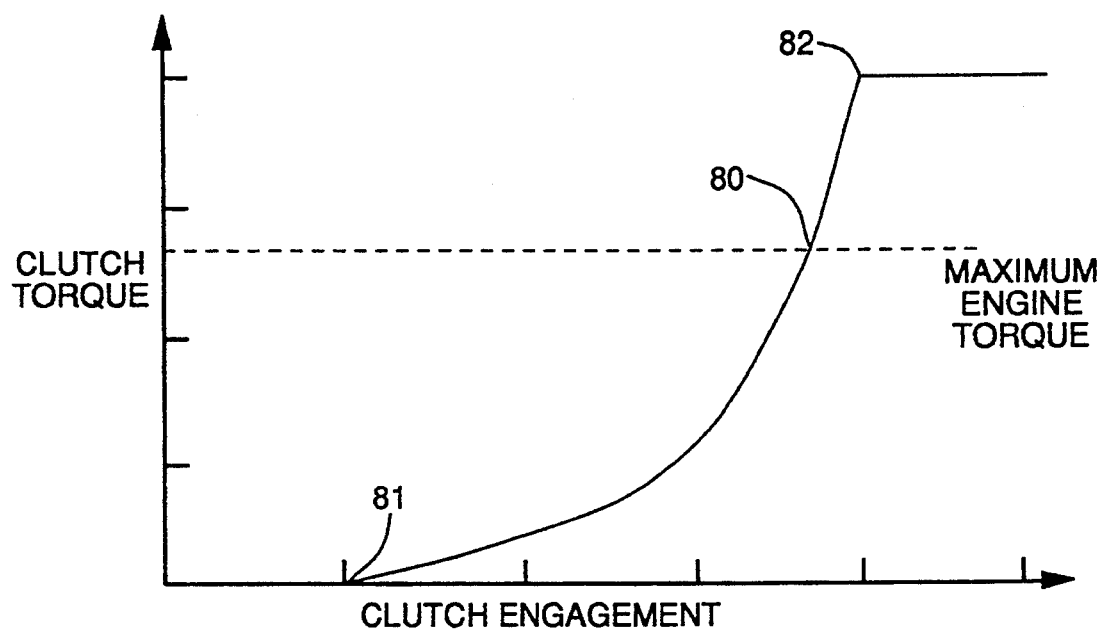
FIG. 2 illustrates the typical relationship between clutch engagement and clutch torque.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60.

Transmission input speed sensor 31 senses the rotational velocity of input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. In the preferred embodiment of the present invention, in which the motor vehicle is a large truck, differential 40 drives four axle shafts 41 to 44 that are in turn coupled to respective wheels 51 to 54.

Transmission shift controller 33 receives input signals from throttle 11, engine speed sensor 13, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Note transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system controlling movable plate 23 to this desired position. It is also feasible for the clutch engagement signal to represent a desired clutch pressure with clutch actuator 27 providing closed loop control to this desired pressure. Depending on the particular vehicle, it may be feasible for clutch actuator 27 to operate in an open loop fashion. The exact details of clutch actuator 27 are not crucial to this invention and will not be further discussed.

Clutch actuation controller 60 preferably generates a predetermined open loop clutch disengagement signal for a ramped out disengagement of clutch 20 upon receipt of the disengage signal from transmission shift controller 33. No adverse oscillatory responses are anticipated for this predetermined open loop disengagement of clutch 20.

Figure 3:
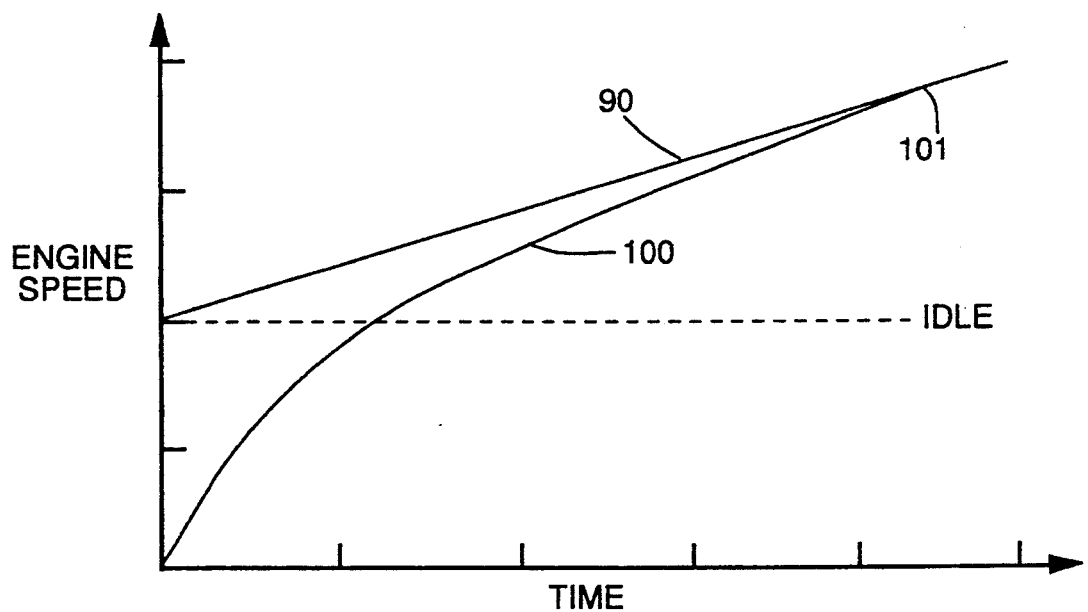
FIG. 3 illustrates the ideal response of engine speed and transmission input speed over time for launch of the motor vehicle.

FIG. 3 illustrates engine speed 90 and transmission input shaft speed 100 for the case of launch, that is starting out from a stop in order to proceed at a reasonable speed. Initially, the engine speed 90 is at idle. Thereafter engine speed 90 monotonically increases within the time frame of FIG. 3. Engine speed 90 either increases or remains the same. Ideally engine speed 90 increases until the torque produced by engine 10 matches the torque required to accelerate the vehicle. At high load this engine speed may be in the mid range between the idle speed and the maximum engine speed. This constant engine speed corresponds to the engine torque required to match clutch torque and driveline torque and achieve a balance between engine output torque and the vehicle load torque. This torque level is the ideal clutch torque because a higher clutch torque would stall engine 10 and a lower clutch torque would allow the engine speed to increase too much. Ultimately the vehicle would accelerate to a speed where clutch 20 can be fully engaged. Thereafter the balance between engine torque and load torque is under the control of the driver via the throttle setting and clutch actuation controller 60 would continue to command full clutch engagement.

When the vehicle is stopped and clutch 20 fully disengaged, transmission input speed 100 is initially zero. This is the case for starting the vehicle. However, as further explained below, this same technique can be used for smooth clutch engagement upon shifting gears while moving. Thus the transmission input speed may initially be a value corresponding to the vehicle speed. Upon partial engagement of clutch 20, transmission input speed 100 increases and approaches engine speed 90 asymptotically. At a point 101, transmission input speed 100 is sufficiently close to engine speed 90 to achieve full engagement of clutch 20 without exciting the torsional compliance of the driveline of the vehicle. At this point clutch 20 is fully engaged. Thereafter transmission input speed 100 tracks engine speed 90 until clutch 20 is disengaged when the next higher final gear ratio is selected by transmission controller 33. The system preferably also operates for the case in which the vehicle is not stopped and the initial transmission input speed is nonzero.

Figure 4:
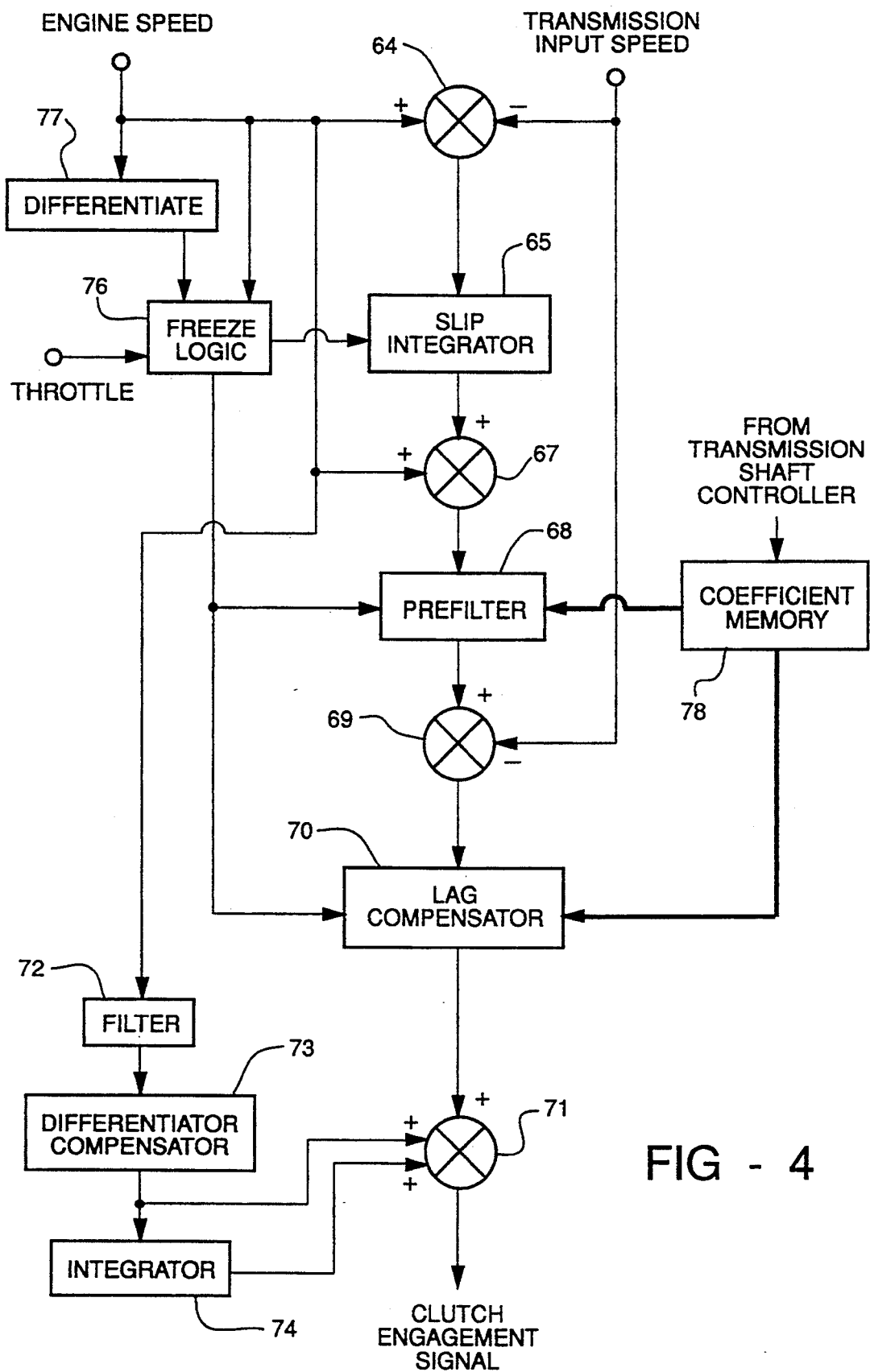
FIG. 4 illustrates the function of an automatic clutch controller shown as a block diagram, according to the invention.

FIG. 4 illustrates schematically the control function of clutch actuation controller 60. As also illustrated in FIG. 1, clutch actuation controller 60 receives the throttle signal from throttle 11, the engine speed signal from engine speed sensor 13 and the transmission input speed signal from transmission input speed sensor 31. Clutch actuation controller 60 illustrated in FIG. 4 generates a clutch engagement signal that is supplied to clutch actuator 27 for operation of the friction clutch 20. Although not shown in FIG. 4, the degree of clutch actuation, together with the throttle setting, the engine speed and the vehicle characteristics determine the transmission input speed that is sensed by transmission input speed sensor 31 and supplied to clutch actuation controller 60. Therefore, the control schematic illustrated in FIG. 4 is a closed loop system.

The control function illustrated in FIG. 4 is needed only for clutch positions between touch point 81 and full engagement. Clutch engagement less than that corresponding to touch point 81 provide no possibility of torque transfer because clutch 20 is fully disengaged. Clutch actuation controller 60 preferably includes some manner of detection of the clutch position corresponding to touch point 81. Techniques for this determination are known in the art. As an example only, the clutch position at touch point 81 can be determined by placing transmission 30 in neutral and advancing clutch 20 toward engagement until transmission input speed sensor 31 first detects rotation. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function illustrated in FIG. 4.

Clutch actuation controller 60 is preferably realized via a microcontroller circuit. Inputs corresponding to the engine speed, the transmission input speed and the throttle setting must be in digital form. These input signals are preferably sampled at a rate consistent with the rate of operation of the microcontroller and fast enough to provide the desired control. As previously described, the engine speed, transmission input speed and transmission output speed are preferably detected via multitooth wheels whose teeth rotation is detected by magnetic sensors. The pulse trains detected by the magnetic sensors are counted during predetermined intervals. The respective counts are directly proportional to the measured speed. For proper control the sign of the transmission input speed signal must be negative if the vehicle is moving backwards. Some manner of detecting the direction of rotation of input shaft 25 is needed. Such direction sensing is conventional and will not be further described. The throttle setting is preferably detected via an analog sensor such as a potentiometer. This analog throttle signal is digitized via an analog-to-digital converter for use by the microcontroller. The microcontroller executes the processes illustrated in FIG. 4 by discrete difference equations in a manner known in the art. The control processes illustrated in FIG. 4 should therefore be regarded as an indication of how to program the microcontroller embodying the invention rather than discrete hardware. It is feasible for the same microcontroller, if of sufficient capacity and properly programmed, to act as both clutch actuation controller 60 and as transmission shift controller 33. It is believed that an Intel 80C196 microcontroller has sufficient computation capacity to serve in this manner.

The engine speed is the reference signal for control; i.e. the engine speed is the desired transmission input speed. Clutch actuation controller 60 includes an integral function. The transmission input speed from transmission input speed sensor 31 is subtracted from the engine speed in algebraic summer 64. Slip integrator 65 integrates this error signal, which is the difference between the desired transmission input speed and the measured transmission input speed, or clutch slip. The integrated difference signal is supplied to algebraic summer 67 which sums the engine speed signal and the integrated error from integrator 65.

Algebraic summer 67 supplies the input to prefilter 68. Prefilter 68 is employed to shape the closed loop transient response of automatic clutch controller 60. This shaping of the transient response has the goal of achieving asymptotic approach of the input speed to the engine speed. The character of prefilter 68 and its manner of determination will be further described below.

The prefiltered signal from prefilter 68 is supplied to algebraic summer 69. Algebraic summer 69 also receives the measured transmission input speed signal from transmission input speed sensor 31. Algebraic summer 69 forms the difference between the prefiltered signal from prefilter 68 and the transmission input speed. This difference is supplied to the lag compensator 70. Lag compensator 70 includes an approximate inverse model of the torsional oscillatory response of the vehicle to torque inputs. Compensator 70 includes a gain versus frequency function selected to reduce variations in the closed loop response of clutch actuation controller 60 due to variations in the transfer function of the vehicle driveline and has increased gain at low frequencies to increase the robustness of the system. Determination of the transfer function of compensator 70 will be further described below.

A feedforward signal is provided in the clutch engagement signal via an engine speed differential signal. The engine speed signal is suitably filtered via low pass filter 72 to reduce noise in the differential signal. Differentiator compensator or acceleration compensator 73 forms a differential signal responsive to the rate of change in the engine speed but is filtered to prevent abrupt decrease due to small engine deceleration. This engine speed differential signal and its integral formed by integrator 74 are supplied to algebraic summer 71. Algebraic summer 71 sums the output of compensator 70, the engine speed differential signal from acceleration compensator 73 and the integral signal from integrator 74 to form the clutch engagement signal. Clutch actuator 27 employs this clutch engagement signal to control the degree of clutch engagement.

The feedforward signal permits better response of clutch actuation controller 60 when the engine speed is accelerating. Under conditions of engine speed acceleration the feedforward signal causes rapid engagement of clutch 20 proportional to the rate of engine acceleration. The engine speed can increase rapidly under full throttle conditions before the driveline torque is established. This is because the speed of response of clutch actuation controller 60 without this feedforward response is low compared with the peak engine speed of response. With this feedforward response rapid engine acceleration results in more rapid than otherwise clutch engagement. The additional clutch engagement tends to restrain increase in engine speed by requiring additional torque from the engine. When the engine speed reaches a constant value, the differential term decays to zero and integrator 74 retains the clutch engagement needed to restrain engine speed. Other portions of the control function then serve to provide asymptotic convergence of the transmission input speed to the reference speed.

Prefilter 68 and compensator 70 perform differing and complementary functions in clutch actuation controller 60. The transfer functions of prefilter 68 and compensator 70 are determined as follows. The transfer function of compensator 70 is selected to reduce sensitivities of the closed loop transfer function to driveline parameter variations. This is achieved by providing sufficient loop gain as a function of frequency. If the sensitivity of the closed loop transfer function H(ω) with respect to the transfer function of the driveline G(ω) is $S_{G(\omega)}^{H(\omega)}$, then $$S_{G(\omega)}^{H(\omega)} = \frac{1}{(1 + C(\omega) \, G(\omega))} \quad (2)$$

where C(ω) is the transfer function of compensator 70. Inspection of this relationship reveals that the sensitivity $S_{G(\omega)}^{H(\omega)}$ can be reduced arbitrarily to zero by increasing the compensator gain. There are practical limits to the maximum compensator gain because of stability and noise problems. Thus the transfer function C(ω) of compensator 70 is selected high enough at all frequencies ω to limit the variations in the closed loop transfer function to an acceptable level set as a design criteria. Enhanced robustness is added by emphasizing the gain at low frequencies.

Compensator 70 includes an approximate inverse model of the torsional oscillatory response. In the typical heavy truck to which this invention is applicable, the torsional compliance of the driveline causes the driveline transfer function to have a pair of lightly damped poles that may range from 2 to 5 Hz. The exact value depends upon the vehicle parameter values. The inverse response of compensator 70 provides a notch filter in the region of these poles. The frequency band of the notch is sufficiently broad to cover the range of expected vehicle frequency responses. This frequency band is preferably achieved employing two pairs of zeros whose frequencies are spread over the frequency range of the vehicle response. Thus compensator 70 provides plural complex zeros in the frequency range of these poles of the vehicle response to attenuate the oscillatory response. The typical heavy truck also includes a pair of complex zeros in the frequency range from 1 to 2 Hz. These complex zeros tend to reduce the system loop gain and hence cause the system to be more sensitive to variations in vehicle characteristics in this frequency range. Compensator 70 preferably provides a pair of complex poles in this frequency range to increase the loop gain and reduce sensitivity to variations in vehicle characteristics. Thus the total response of the closed loop system has highly damped eigen values providing a less oscillatory system.

Prefilter 68 is employed to reliably achieve a desired closed loop transient response. The transfer function H(ω) of the closed loop system without prefilter 68 is:

$$H(\omega) = \frac{C(\omega) \, G(\omega)}{(1 + C(\omega) \, G(\omega))} \quad (3)$$

where C(ω) is the transfer function of compensator 70 and G(ω) is the transfer function of the driveline. The above noted design for compensator 70 takes into account only reduction in sensitivity to variations in the driveline response G(ω). This typically results in a closed loop response H(ω) having an inappropriate time response. The design goal it to actuate clutch 20 to achieve asymptotic convergence of the transmission input speed to engine speed. The transfer function H(ω) with prefilter 68 is:

$$H(\omega) = \frac{F(\omega) \, C(\omega) \, G(\omega)}{(1 + C(\omega) \, G(\omega))} \quad (4)$$

where F(ω) is the transfer function of prefilter 68. Prefilter 68 is a low pass filter with the pass band related to the design rate of asymptotic convergence.

The above outlined determination of the response character of prefilter 68 and compensator 70 corresponds to the quantitative feedback theory of Horowitz. This theory is exemplified in "Quantitative Feedback Theory" by I. M. Horowitz, IEE Proceedings, Vol. 129, PT.d, no. 6, November, 1982. This selection of the response of prefilter 68 and compensator 70 results in a system that is robust, that is, capable of properly responding to widely varying vehicle conditions.

As noted above, the elements of FIG. 4 are preferably implemented via discrete difference equations in a microcontroller. In the preferred embodiment the i-th value of the output $P_i$ of prefilter 68 is given by:

$$P_i = k_{P1}I_{i-1} + k_{P2}I_i + k_{P3}P_{i-1} + k_{P4}P_{i-2} \quad (5)$$

where; $I_i$ is the current value of the prefilter input; $I_{i-1}$ is the immediately preceding value of the prefilter input; $P_{i-1}$ is the immediately preceding value of the prefilter output; $P_{i-2}$ is the next preceding value of the prefilter output; and where the $k_{Pn}$ are coefficients with $k_{P1}=0.00015$, $k_{P2}=0.00015$, $k_{P3}=1.9677$, and $k_{P4}=-0.9860$.

The discrete difference equation of compensator 70 is preferably implemented in three stages. This enables the compensator coefficients to have sufficiently fewer significant figures for a 16 bit integer digital implementation of this process. The i-th value of the first intermediate variable $F1_i$ is given by:

$$F1_i = k_{C1}C_i + k_{C2}C_{i-1} + k_{C3}C_{i-2} + k_{C4}F1_{i-1} + k_{C5}F1_{i-2} \quad (6)$$

where: $C_i$ is the current value of the compensator input; $C_{i-1}$ is the immediately preceding value of the compensator input; $C_{i-2}$ is the next preceding value of the compensator input; $F1_{i-1}$ is the immediately preceding value of the first intermediate variable; $F1_{i-2}$ is the next preceding value of the first intermediate variable; and where the $k_{Cn}$ are coefficients with $k_{C1}=0.667$, $k_{C2}=-1.16$, $k_{C3}=0.5532$, $k_{C4}=1.482$, and $k_{C5}=-0.5435$. Note that the successive compensator input values $C_i$ are computed from successive differences between the prefilter output and the transmission input speed. The i-th value of the second intermediate variable $F2_i$ is given by:

$$F2_i = k_{C6}F1_i + k_{C7}F1_{i-1} + k_{C8}F1_{i-2} + k_{C9}F2_{i-1} + k_{C10}F2_{i-2} \quad (7)$$

where: $F1_i$ is the current value of the first intermediate variable; $F1_{i-1}$ is the immediately preceding value of the first intermediate variable; $F1_{i-2}$ is the next preceding value of the first intermediate variable; $F2_{i-1}$ is the immediately preceding value of the second intermediate variable; $F2_{i-2}$ is the next preceding value of the second intermediate variable; and where the $k_{Cn}$ are coefficients with $k_{C6}=0.2098$, $k_{C7}=-0.39$, $k_{C8}=0.189$, $k_{C9}=1.8432$, and $k_{C10}=-0.8518$. Lastly, the i-th value of the compensator output $O_i$ is:

$$O_i = k_{C11}F2_i + k_{C12}F2_{i-1} + k_{C13}F2_{i-2} + k_{C14}O_{i-1} + k_{C15}O_{i-2} \quad (8)$$

where: $F2_i$ is the current value of the second intermediate variable; $F2_{i-1}$ is the immediately preceding value of the second intermediate variable; $F2_{i-2}$ is the second preceding value of the second intermediate variable; $O_{i-1}$ is the immediately preceding value of the compensator output; $O_{i-2}$ is the second preceding value of the compensator output; and where the $k_{Cn}$ are coefficients with $k_{C11}=0.25$, $k_{C12}=-0.4925$, $k_{C13}=0.2426$, $k_{C14}=1.991$, and $k_{C15}=-0.991$.

The slip integrator 65, the prefilter 68 and the compensator 70, comprising the principle functions of the main control loop, are subject to being suspended in operation upon the generation of a freeze signal which is indicative of engine overload. To generate a freeze signal, a logic module 76 receives inputs of throttle position, engine speed, and engine acceleration, the latter being derived from engine speed by a differentiator 77. The logic algorithm produces a freeze signal when 1) engine acceleration is less than zero, or 2) when the throttle position is at least 60% of its full range while the engine speed is less than 35% of top speed. Both conditions reveal engine overload: engine deceleration shows that engine torque is not sufficient to keep pace with increasing clutch torque, and a relatively low engine speed (just above idle speed) coupled with a relatively high torque demand also shows the engine is not responding satisfactorily. When the control functions are frozen or suspended, at least that portion of the clutch engagement signal coming from the compensator 70 is not requiring further clutch engagement, and the portion from the differentiator 73 will not increase without engine acceleration.

Figure 5:
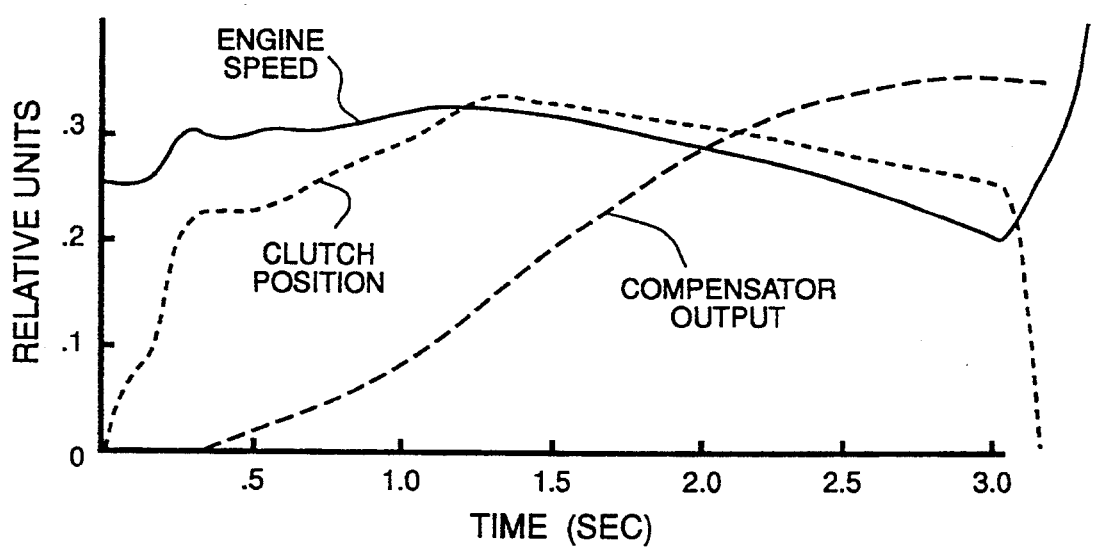
FIG. 5 is graph of engine speed, clutch position, and compensator output without a freeze function, but with the slip integrator disabled upon engine deceleration.

FIG. 5 is graph of engine speed, clutch position, and compensator output without the freeze function, but with the slip integrator 65 disabled upon engine deceleration, for an attempted clutch engagement at full load in second gear. Initially the engine speed increases slowly but as the clutch advances, due to increasing compensator output, the engine speed starts to decrease (at about 1.2 sec) and continues to decline until the clutch dumps (at 3 sec) and engine speed flares, under action by a stall prevention feature, not shown, which is triggered by the low engine speed.

Figure 6:
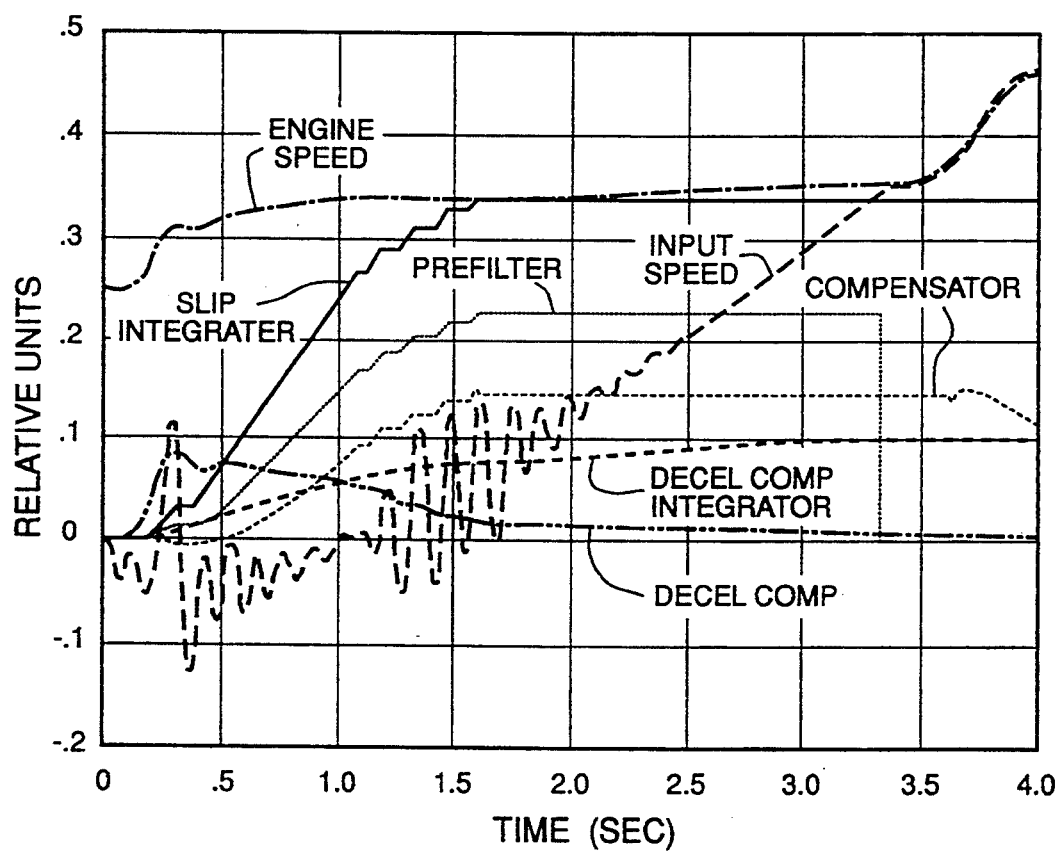
FIG. 6 shows graphs made under the same operating conditions as the FIG. 5 case, but the freeze function is active.

FIG. 6 shows graphs made under the same operating conditions as the FIG. 5 case, but the freeze function is active. This graph shows the engine speed, the input speed, the outputs of the slip integrator 65, the prefilter 68, the compensator 70, the acceleration compensator 73 and the integrator 74. It is evident that when the engine decelerates between 0.3 and 0.4 seconds that the freeze algorithm suspends the slip integrator function to hold the integrator output constant until acceleration resumes. The output then continues to increase from its former value (prior to the freeze) without a transient. Again between 1.1 and 1.5 seconds, even though deceleration is not visibly perceptible from the engine speed trace, engine deceleration is detected by the freeze algorithm four more times to freeze the functions of the slip integrator, the prefilter and the compensator, causing brief plateaus in each of the outputs. As a result, the compensation output increases slowly (compared to the FIG. 4 case) to cause sufficiently slow clutch engagement to maintain nearly constant engine speed. Then after 1.5 seconds, the throttle position (not shown) exceeds 60% of its full range and since the slowly increasing engine speed remains below 35% of top speed, the freeze is triggered again and continues throughout the remainder of the clutch control period to hold the three principal functions constant. After 1 second the input speed increases under the influence of the initial gently increasing clutch advance, although some minor oscillations occur. At 3.3 seconds the input speed becomes substantially equal to the engine speed and clutch lockup occurs due to another control, not shown, to terminate the clutch control period.

Note that initially, prior to 0.5 second, the acceleration compensator 73 responds quickly to engine acceleration to advance the clutch, and after 0.5 second when engine speed changes slowly, the acceleration compensator filtered output decays slowly. Then the integrator 74 output increases enough to offset the decay and thus the acceleration compensator and the integrator together maintain a constant contribution to the clutch engagement signal.

The present invention can be advantageously employed for clutch re-engagement following shifts of the transmission. In this event the same control processes illustrated in FIG. 4 would be employed, including the above listed discrete difference equations for prefilter 68 and compensator 70. The control processes for transmission shifts would differ from the preceding description in selection of the coefficients $k_{P1}$ to $k_{P4}$ and $k_{C1}$ to $k_{C15}$. A particular set of these coefficients $k_n$ would be recalled from coefficient memory 75 depending upon the gear signal from transmission shift controller 33. The selected set of coefficients may also include coefficients of integration for integrators 65 and 74, and coefficients for filter 72 and differentiator 73. In other respects the invention would operate the same as described above.

The control processes of the present invention are robust with regard to variations in vehicle response. It is believed that the automatic clutch controller herein described is capable of handling changes in vehicle loading within a single vehicle and variations in response between differing combinations of engine, clutch and driveline oscillatory response between different vehicles. Thus the automatic clutch controller of this invention need not be particularized for a particular vehicle. Thus the invention automatic clutch controller is easier to manufacture for a variety of vehicles.

The embodiments of the invention in which an exclusive property or privilege is claimed are defined as follows:

1. In a combination including a source of motive power controlled by a throttle, a friction clutch having an input shaft connected to the source of motive power and an output shaft, and at least one inertially-loaded traction wheel connected to the output shaft of the friction clutch having a torsional compliance exhibiting an oscillatory response to torque inputs, an automatic clutch controller comprising:

a throttle sensor connected to the throttle for generating a throttle signal dependent on the throttle position;

an engine speed sensor connected to the source of motive power for generating an engine speed signal corresponding to the rotational speed of the source of motive power;

a transmission input speed sensor connected to the output shaft of the friction clutch for generating a transmission input speed signal corresponding to the rotational speed of the output shaft of the friction clutch;

a clutch actuator connected to the friction clutch for controlling engagement of the friction clutch from disengaged to fully engaged according to a clutch engagement signal; and a controller connected to said engine speed sensor, said transmission input speed sensor and said clutch actuator including
 a prefilter connected to said engine speed sensor for generating a filtered engine speed signal,
 a first algebraic summer connected to said transmission input speed sensor and said prefilter generating a first algebraic sum signal corresponding to the difference between (1) said filtered engine speed signal and (2) said transmission input speed signal, and
 a lag compensator connected to said first algebraic summer for increasing low frequency loop gain and for generating said clutch engagement signal for supply to said clutch actuator for engaging the friction clutch in a manner causing said transmission input speed to asymptotically approach said engine speed.

2. The automatic clutch controller as claimed in claim 1, wherein the controller connected to said engine speed sensor said transmission input speed sensor and said clutch actuator includes:
 freeze logic for generating a freeze signal in response to engine deceleration, and
 means responsive to the freeze signal for suspending the compensator operation whereby the compensator output remains constant and clutch engagement is abated during engine deceleration.

3. The automatic clutch controller as claimed in claim 2, further including
 means responsive to the freeze signal for suspending the prefilter operation whereby the prefilter output remains constant for the duration of the freeze signal.

4. The automatic clutch controller as claimed in claim 2, further including:
 a slip integrator responsive to the difference of the engine speed signal and the input signal for producing an integrator signal;
 means for feeding the integrator signal to the prefilter along with the engine speed signal;
 means responsive to the freeze signal for suspending the prefilter operation whereby the prefilter output remains constant for the duration of the freeze signal, and
 means responsive to the freeze signal for suspending the slip integrator operation whereby the integrator output remains constant for the duration of the freeze signal.

5. The automatic clutch controller as claimed n claim 1, wherein the controller connected to said engine speed sensor, said transmission input speed sensor and said clutch actuator includes:
 freeze logic coupled to the engine speed signal and the throttle signal for generating a freeze signal in response to engine deceleration and when the throttle signal and engine speed signal are above respective threshold values; and
 means responsive to the freeze signal for suspending the prefilter and the compensator operation whereby the compensator output remains constant and clutch engagement is abated during the freeze signal.

6. The automatic clutch controller as claimed in claim 1, further including:
 a slip integrator responsive to the difference of the reference speed signal and the input signal for producing an integrator signal;
 means for summing the integrator signal and the engine speed signal for input to the prefilter;
 a differentiating compensator responsive to the engine speed signal for producing a lead signal;
 a second integrator responsive to the lead signal for producing a second integrator signal; and
 means for summing the output of the lag compensator, the lead signal and the second integrator signal to produce the clutch engagement signal.

7. The automatic clutch controller as claimed in claim 6, wherein the controller connected to said engine speed generator, said transmission input speed sensor and said clutch actuator includes:
 freeze logic coupled to the engine speed signal and the throttle signal for generating a freeze signal either during engine deceleration or when both the throttle signal and the engine speed signal are above respective threshold values; and
 means responsive to the freeze signal for suspending the operation of the slip integrator, the prefilter and the lag compensator whereby the lag compensator output remains constant and clutch engagement is controlled by the lead signal and the second integrator signal during the freeze signal.

8. In a combination including an engine controlled by a throttle, a transmission having an input shaft, a traction wheel driven by the transmission, and a friction clutch connected between the engine and the transmission input shaft having a torsional compliance exhibiting an oscillatory response to torque inputs, and an automatic clutch control apparatus comprising sensors for the throttle position, engine speed, and input shaft speed, a clutch actuator connected to the friction clutch for controlling engagement of the friction clutch from disengaged to fully engaged positions according to a clutch engagement signal; a method of generating a clutch engagement signal comprising the steps of:
 determining the engine speed and the input shaft speed;
 producing a slip integral value by integrating the difference of the engine speed and the input shaft speed;
 summing the engine speed and the slip integral value and filtering the sum;
 generating an error by subtracting the input shaft speed from the filtered sum; and
 compensating the error to produce a compensated output value by increasing low frequency loop gain and maintaining reduced sensitivity to variations in the response to torque inputs of the traction wheel to generate said clutch engagement signal to thereby engage the friction clutch in a manner causing said transmission input speed signal to asymptotically approach said engine speed signal.

9. The method of generating a clutch engagement signal according to claim 8 comprising the further steps of:
 differentiating the engine speed to produce a feedforward signal;
 integrating the feedforward signal; and
 combining the feedforward signal, the integrated feedforward signal and the compensated output value to generate said clutch engagement signal.

10. The method of generating a clutch engagement signal according to claim 9 comprising the further steps of:
 producing a freeze signal in response to an engine speed parameter indicative of engine overload; and freezing the compensated output value of the compensating step during the freeze signal;
whereby the engine overload is mitigated.

11. The method of generating a clutch engagement signal according to claim 9 comprising the further steps of:
producing a freeze signal in response to an engine deceleration and in response to engine speed below a first threshold and throttle position above a second threshold; and
freezing the output values of the compensating step, the filtering step and the integrating step during the freeze signal to thereby suspend the effect of the compensated output value on the clutch engagement signal.

12. The method of generating a clutch engagement signal according to claim 8 comprising the further steps of:
producing a freeze signal in response to an engine speed parameter indicative of engine overload; and
freezing the compensated output value of the compensating step during the freeze signal;
whereby the engine overload is mitigated.

13. The method of generating a clutch engagement signal according to claim 8 comprising the further steps of:
producing a freeze signal in response to an engine deceleration and in response to engine speed below a first threshold and throttle position above a second threshold; and
freezing the output values of the compensating step, the filtering step and the integrating step during the freeze signal to thereby suspend the effect of the compensated output value on the clutch engagement signal.

* * * * *